United States Patent [19]

Holzer

[11] Patent Number: 5,229,217
[45] Date of Patent: Jul. 20, 1993

[54] DECORATIVE HIGH-PRESSURE LAMINATE AND A PROCESS FOR PRODUCING A SURFACE LAYER THEREON

[75] Inventor: Herbert Holzer, Gross-Umstadt, Fed. Rep. of Germany

[73] Assignee: Resopal GmbH, Fed. Rep. of Germany

[21] Appl. No.: 674,350

[22] PCT Filed: Oct. 30, 1989

[86] PCT No.: PCT/EP89/01291
§ 371 Date: Jul. 25, 1991
§ 102(e) Date: Jul. 25, 1991

[87] PCT Pub. No.: WO90/06232
PCT Pub. Date: Jun. 14, 1990

[30] Foreign Application Priority Data

Dec. 5, 1988 [DE] Fed. Rep. of Germany ....... 3840877

[51] Int. Cl.$^5$ ............................................. B32B 27/08
[52] U.S. Cl. .................................... 428/503; 428/525; 428/530; 428/537.5; 427/411; 427/214
[58] Field of Search ............... 428/503, 526, 525, 530, 428/537.5; 427/411, 214

[56] References Cited

U.S. PATENT DOCUMENTS 2,413,931  1/1947  Stamatoff .
3,345,248 10/1967  Pounds et al. ..................... 428/503
4,765,858  8/1988  Vankerckhoven et al. .

FOREIGN PATENT DOCUMENTS 25430    3/1981  European Pat. Off. .
114226  11/1990  European Pat. Off. ........... 428/503
1452858 10/1976  United Kingdom .

Primary Examiner—Edith Buffalow
Attorney, Agent, or Firm—Burns, Doane, Swecker & Mathis

[57] ABSTRACT

The invention concerns the production of a decorative high-pressure laminate with a surface layer (3) on the surface of which an adhesive primer layer (4) of polyvinyl butyral is applied. The adhesive primer layer (4) enables a lacquer coating to be applied subsequently, so that a lacquer layer optimally suited to the particular application for which the laminate is eventually used can be chosen. The adhesive primer layer (4) can be applied by impregnating a web of paper with melamine resin, dusting the impregnated web with polyvinyl butyral powder while the resin is still wet and then drying. Another way of producing the coat is to apply polyvinyl butyral in alcoholic solution to a web of paper which has been impregnated with melamine resin and dried, and subsequently drying.

14 Claims, 1 Drawing Sheet

DECORATIVE HIGH-PRESSURE LAMINATE AND A PROCESS FOR PRODUCING A SURFACE LAYER THEREON

This invention relates to a decorative laminated panel that consists of several layers of core papers impregnated with phenolic resin and a surface layer of decorative paper or overlay paper impregnated in melamine resin.

Decorative laminated panels according to DIN 16 926, also referred to as high-pressure laminates (HPL), present on the top side of the core made-up of core papers a surface layer that consists of a single-color or printed decorative paper and possibly a transparent overlay paper; this surface layer is impregnated with melamine resin or a similar amino plastic resin and then pressed together with the core papers.

An essential and important feature for the use of the laminated panels is the resistance of the melamine resin surfaces to the effects of many chemicals. It is disadvantageous, however, that lacquers of the various lacquer systems adhere very poorly to the melamine resin surface. However, because of the relatively great hardness and vitreous structure of the melamine resin surface it would be desirable to apply a somewhat softer and viscous coating of lacquer but not as brittle. The fields of applications of the decorative laminated panels would be greatly expanded by such a surface configuration.

In fact, it is known (from DE-A-36 30 315) that a wear resistant acrylic coating can be applied to the surface of a decorative laminated panel. But this acrylic coating must harden together with the melamine resin during the pressing process and for this reason cannot be applied subsequently. Thus, in this manner it is not possible to produce decorative laminated panels to which a lacquer coating suited to the particular field of application can be applied in any subsequent stage of production. An acrylic lacquer that is applied to the melamine resin surface after the melamine resin has hardened would not be sufficiently adhesive.

It is also known (from GB-A-1 452 858) that polyvinyl butyral is applied as adhesive layer to the back of a decorative backing paper not impregnated with melamine resin. This adhesive layer shall effect in the subsequent pressing process the bonding of the untreated decorative paper with the phenolic-resin impregnated core of the laminated panel which at this time is not yet completed.

The polyvinyl butyral does not constitute in this process an adhesive primer layer to which a lacquer coating that is applied at any subsequent time would adhere better but it is directly an adhesive. Therefore, polyvinyl butyral is mentioned herein merely as an example of one of the several thermosetting resins. It is only through the thermosetting of this resin that the adhesive effect is obtained by means of which the not impregnated decorative paper is bonded to the resin-impregnated core of the laminated panel in the subsequent pressing process.

It is known ("Pioloform B" brochure of the Wacker Company) that melamine resins can be combined with polyvinyl butyral in order to obtain stoving lacquers or resin systems that harden at room temperature. This admixture of polyvinyl butyral to the melamine resin with which is impregnated the paper web for the surface layer is unsuitable production of surface layers for decorative laminated panels because the melamine resin used to impregnate the decorative papers is present in an aqueous solution while polyvinyl butyral is not sufficiently soluble in water.

Thus, it is task of this invention to produce a decorative laminated panel of the initially described type with a surface that can be lacquered.

According to the invention, this task has been solved in that the surface of the surface layer has a polyvinyl butyral adhesive primer layer.

An excellent adhesive layer for lacquers is obtained by the adhesive layer of polyvinyl butyral applied to the outer surface of the surface layer; this does not affect in any manner the structure and the visual properties of the laminated panel itself. The lacquer coating can be then applied to the thus prepared surface of the laminated panel at any time during the manufacturing process. The appearance and the mechanical properties of a laminated panel with such an adhesive primer layer do not differ from the corresponding properties of a conventional laminated panel without such an adhesive primer layer.

This invention also applies to a process for producing a surface layer for a decorative laminated panel of the initially described type.

The process according to the invention starts from a known process used for the producing of a surface layer for a decorative laminated panel, wherein a surface layer web of decorative paper or overlay paper is impregnated with melamine resin and then dried. The thus obtained surface layer web is placed on a stack of core papers and is pressed with these to form a laminated panel.

It is the task of this invention to describe a process by means of which the adhesive primer layer can be applied in a manner as simple as possible that would reduce labor and material to a minimum.

According to a first solution according to this invention, this has been solved in that polyvinyl butyral from an alcohol solution as an adhesive primer layer is applied to the surface layer web after the drying, and that the surface layer web is subsequently dried anew.

The solution can be applied in a simple manner, using all functional customary coating methods, such as wire rakes, roller rakes, textured rollers or the like.

The development of the underlying idea of this invention provides for the polyvinyl butyral to be applied as adhesive primer layer contains polyvinyl acetal, polyvinyl acetate and polyvinyl alcohol; preferably 75-85% of polyvinyl acetal, 12-22% of polyvinyl acetate and about 3% of polyvinyl alcohol (in each instance, percentage by weight).

According to another preferred solution according to the invention provides for the dusting of the melamine-resin impregnated surface layer web with powdery polyvinyl butyral while the resin is still wet and drying it afterwards so that an adhesive primer layer be formed.

This method eliminates the need to prepare the polyvinyl butyral as an alcohol solution, so that no solvent vapors are generated during the processing, thus preventing sources of emission. Also eliminated is the need for a second drying stage, since the adhesive primer layer is applied to the paper web while it is still wet with resin, that is to say, prior to the single drying stage.

Other advantageous embodiments of the processes according to the invention are subject of other subclaims.

Below are disclosed examples of embodiment of the invention by means of the drawing, in which.

Figure 1:
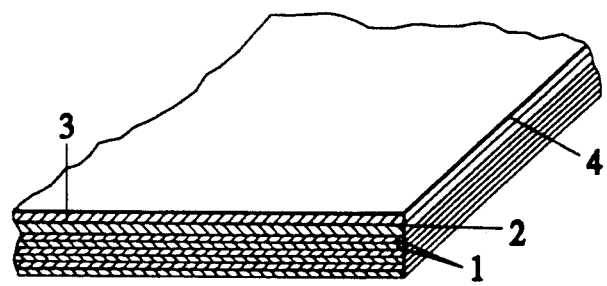
FIG. 1 is an enlarged spatial representation of a decorative laminated panel, partly in cross-section.

The decorative laminated panel shown in FIG. 1 consists of several layers of core papers 1 that are impregnated with phenolic resin. On the upper side of the stack consisting of the core papers 1 is placed a melamine-resin impregnated decorative paper 2 that can directly constitute the surface layer of the laminated panel. In the embodiment example shown in FIG. 1 an overlay paper 3, also impregnated with melamine resin, is placed on the decorative paper 2 as a surface layer. Subsequent to drying, all layers are pressed together so as to form the laminated panel.

An adhesive primer layer 4 of polyvinyl butyral is applied to the surface of the surface layer 3. This adhesive primer layer 4 constitutes a primer or adhesive agents that forms an adhesive base for lacquers. The adhesive primer layer is preferably applied at a rate of 2-10 g/m².

Figure 2:
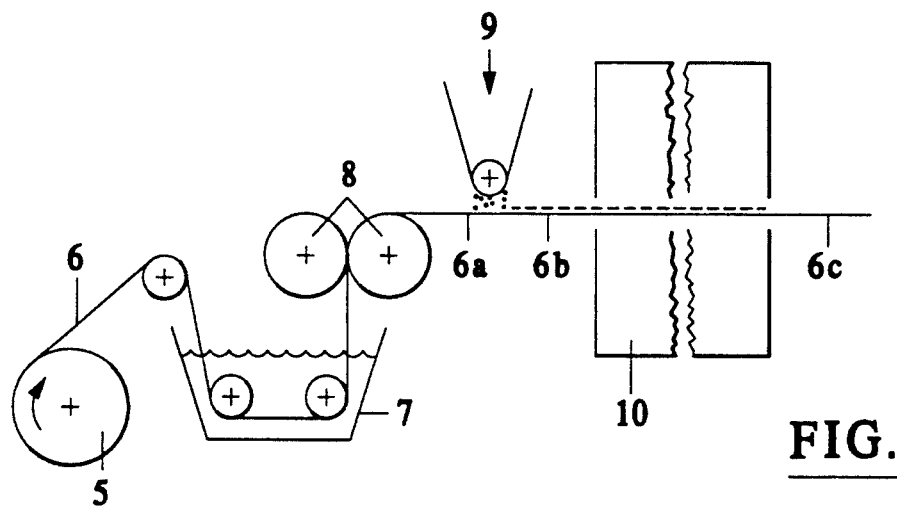
FIG. 2 is a simplified diagrammatic view of the manufacturing process of a surface layer web for a decorative laminated panel that is provided with an adhesive primer layer.

FIG. 2 shows one of the possible processes used to apply the adhesive primer layer 4. A paper web 6 of the decorated paper or of the overlay paper is pulled off a roll of backing paper 5 and passed through an impregnating bath 7 filled with liquid melamine resin. The excessive melamine resin is removed between the squeeze rollers 8 installed behind the bath.

The surface layer web 6a, still wet with resin, is conveyed beneath a dusting system 9. The system applies a thin surface layer of powdery polyvinyl butyral having a particle size of 5-50 μm to the paper web that is still wet with resin. This dusting is effected mechanically or, preferably, electrostatically in that the powdery polyvinyl butyral is applied by accelerating the powder particles in an electrostatic field.

Subsequently, the coasted paper web 6a, still wet with resin, passes through a suspension dryer 10 in which is dried the melamine resin. The thus obtained surface layer web 6c is used in a customary manner for the manufacture of a laminated panel as illustrated in FIG. 1, by way of example.

Figure 3:
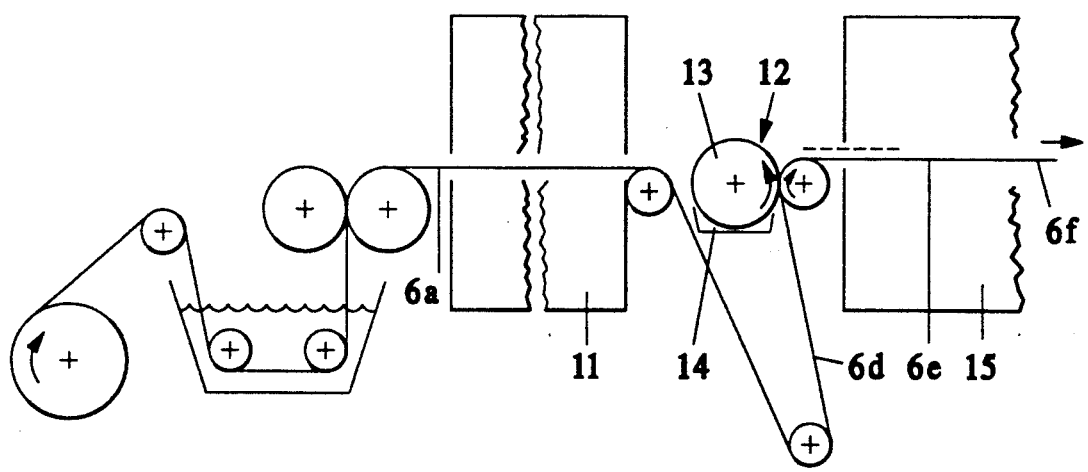
FIG. 3 is another process of manufacture corresponding to the diagram of FIG. 2.

FIG. 3 illustrates another embodiment of the process. As described earlier for FIG. 2, a paper web 6 of the decorative paper or overlay paper is pulled off a roll of backing paper 5 and conveyed through an impregnating bath 7 filled with liquid melamine resin. The excessive melamine resin is removed between the squeeze rollers 8 installed behind the bath.

The paper web, still wet with resin, is dried in a first suspension dryer 11. An adhesive primer layer of an alcohol solution, that is contained in a bath 14 into which dips the raking roller 13, is applied in a coating appliance 12 to the dried surface layer web 6d; by way of example, this coating appliance has a raking roller 13.

The polyvinyl butyral used in this process contains preferably 75-85% of polyvinyl acetal, 12-22% of polyvinyl acetate and about 3% of polyvinyl alcohol. The primer is applied from the alcohol solution to the paper web 6d that is impregnated with melamine resin and dried, for which can be used the homologous series of methanol to butanol. Also appropriate are the isomeric forms of propanol and butanol. Solutions with a content of solid matter of 5-15% have proven to be successful.

The solution can be applied with all normally used coating systems; in addition to the described raking roller one can also use wire rakes, textured rollers and the like.

Subsequently, the coated web 6e passes through a second suspension dryer 15 in which is dried the adhesive primer layer. The surface layer web 6f coming from the suspension dryer 15 can then be processed in the same manner as the surface layer web 6c illustrated, by way of example, in FIG. 2.

I claim:

1. Decorative laminated panels, consisting of several layers of core papers impregnated with phenolic resin and a surface layer of decorative paper or overlay paper impregnated with melamine resin, wherein the surface layer has an adhesive primer layer (4) of polyvinyl butyral.

2. A process for the production of a surface layer for a decorative laminate panel according to claim 1 comprising impregnating said surface layer web of decorative paper or overlay paper with a melamine resin, drying the surface layer web, applying an adhesive primer layer of polyvinyl butyral to the surface layer web and drying the surface layer web anew.

3. A process according to claim 2, wherein the polyvinyl butyral applied as the adhesive primary layer contains polyvinyl acetal, polyvinyl acetate and polyvinyl alcohol.

4. A process according to claim 3, wherein the polyvinyl butyral applied as the adhesive primer layer contains 75-85% of polyvinyl acetal, 12-22% of polyvinyl acetate and about 3% of polyvinyl alcohol.

5. A process according to claim 2, wherein the polyvinyl butyral of an alcohol solution is applied.

6. A process according claim 5, wherein alcohol of the homologous series of methanol to butanol is used as a solvent.

7. A process according to claim 5, wherein an alcohol of the isomeric forms of propanol or butanol is used as a solvent.

8. A process according to claim 5, wherein a 5-15% solid content solution is used.

9. A process for the production of a surface layer for a decorative laminated panel according to claim 1, comprising impregnating a surface layer web of decorative paper or overlay paper with melamine resin, dusting with powdery polyvinyl butyral while the resin is still wet and then drying so as to form an adhesive primer layer.

10. A process according to claim 9, wherein the powdery polyvinyl butyral used is applied by accelerating the powder particles in an electrostatic field.

11. A process according to claims 9 or 10, wherein the powdery polyvinyl butyral is applied by accelerating the powder particles in an electrostatic field.

12. A process according to claim 9, wherein the amount of 2-10 g/m² of polyvinyl butyral is applied to the surface of the surface layer to form the adhesive primer layer.

13. A process according to claim 2, wherein the amount of 2-10 g/m² of polyvinyl butyral is applied to the surface of the surface layer to form the adhesive primer layer.

14. A decorative laminated panel, comprising several layers of core papers impregnated with phenolic resin; a surface layer of decorative paper, overlay paper or both decorative paper and overlay paper impregnated with a melamine resin; and an adhesive primer layer of polyvinyl butyral.

* * * * *